Nov. 15, 1949     A. C. DE CHANT ET AL     2,487,922
CURB SIGNAL SWITCH
Filed Dec. 31, 1947
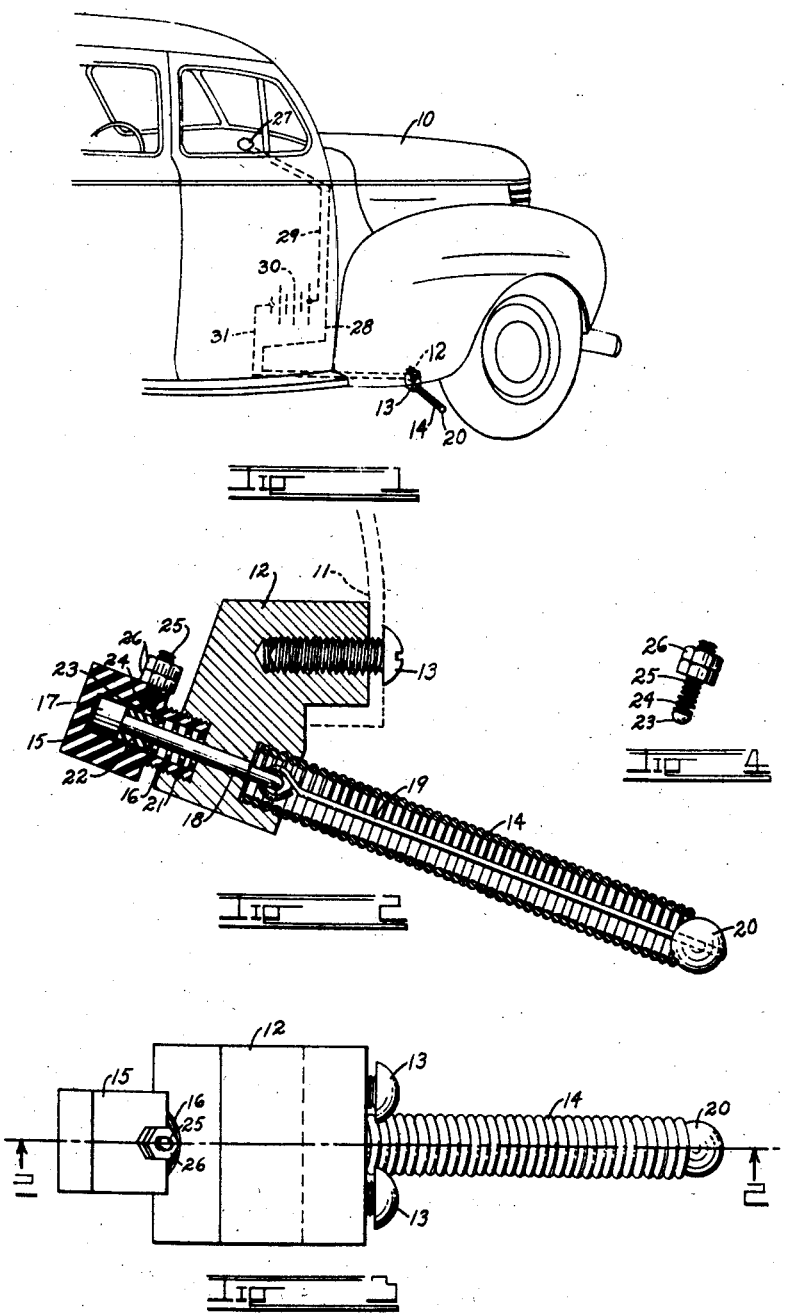
INVENTORS
ALOIS C. DE CHANT
BY FRANK C. JACHETTA
ATTORNEY

UNITED STATES PATENT OFFICE 2,487,922

CURB SIGNAL SWITCH

Alois C. DeChant and Frank C. Jachetta,
Denver, Colo.

Application December 31, 1947, Serial No. 794,926

3 Claims. (Cl. 200—52)

This invention relates to what might be termed a curb signal for automobiles, and has for its principal object the provision of a simple and highly efficient device which will indicate to the driver of an automobile when the right side of the automobile has properly approached a curb or other side obstruction.

Another object of the invention is to so construct the device that neither it nor the automobile will be damaged by contact with curbs and other obstructions, and so that it will not damage property or injure persons standing close to the side of the automobile.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 illustrates the invention applied to the typical automobile, with the electric circuits employed indicated in broken line;

Fig. 2 is an enlarged section through the improved curb signal indicator, taken on the line 2—2, Fig. 3;

Fig. 3 is a top view of the indicator in Fig. 1; and

Fig. 4 is a detail view, illustrating a contact brush member employed in the invention.

A typical automobile is indicated at 10, with its fender at 11.

The improved curb signal indicator comprises a supporting block 12 provided with means for securing it beneath the fender 11. As illustrated, two clamp screws 13 are employed, which are threaded into the block 12 through openings in the fender 11 so as to clamp the block tightly beneath the lower edge of the fender.

A tightly coiled helical spring 14 extends outwardly and downwardly from the block 12, it being secured in a receiving socket in the block in any desired manner, such as by being screwed therein.

A contact housing 15 of electrical insulating material is placed on the opposite side of the block 12. The housing 15, as illustrated, is provided with a threaded nipple 16 also of insulating material which is screwed into the block 12 opposite the spring 14. The nipple 16 and the housing 15 are drilled to provide a cylindrical passage in which a metallic contact piston 17 is slidably mounted.

The piston 17 is formed on the extremity of a piston rod 18, which extends through the block 12, terminating within the spring 14. The extremity of the rod 18 within the spring 14 is perforated to receive a pull wire 19 which extends throughout the length of the spring 14, terminating in a terminal ball 20. The pull wire 19 extends through the ball and may be soldered therein. A compression spring 21 acts against the piston 17 to constantly pull the ball 20 against the end of the spring 14.

An insulating sleeve 22 surrounds the piston rod 18 between the piston 17 and the spring 21. A contact brush member 23 is urged against the insulating sleeve 22 by means of a contact spring 24. Pressure is applied to the spring 24 by means of a contact screw 25 provided with binding nuts 26.

In use, the contact screw 25 is connected to a suitable signal device 27 on the instrument board of the automobile 10 by means of a conductor 28. The opposite side of the signal device is connected to a battery circuit 29 leading to the car battery 30. The opposite side of the car battery is grounded, as indicated by the ground line 31.

Let us assume that the device is in the position of Fig. 1, and that the car is driven up to a side obstruction, such as a curb, so that the ball 20 strikes the curb. This bends the spring 14 rearwardly, causing the pull wire 19 to pull upon the piston rod 18 to cause the piston 17 to move downwardly into contact with the brush 23. This closes the circuit from the battery 30 to the signal device 27, indicating to the driver that the right-hand side of his automobile is dangerously close to the curb.

While more particularly designed for indicating the relative position between the car and the curb, the device will also indicate close approaches to other cars, doorways, bridges, and other obstructions.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. Means for indicating the nearness of an object to the side of an automobile, comprising: a supporting block secured to said automobile; a tubular helical spring extending sidewardly from said block; a piston rod extending from within said spring through said block; a piston mounted on the extremity of said rod; a tubular guide for said piston; a contact member extending into said guide to be contacted by said piston; a tension member extending from said piston rod throughout the length of said spring; and a ball on the extremity of said tension member bearing against the extremity of said spring so that when said spring is flexed, said tension member will pull said piston into contact with said contact member.

2. Means for indicating the nearness of an object to the side of an automobile, comprising: a supporting block secured to said automobile; a tubular helical spring extending sidewardly from said block; a piston rod extending from within said spring through said block; a piston mounted on the extremity of said rod; a tubular guide for said piston; a contact member extending into said guide to be contacted by said piston; a tension member extending from said piston rod throughout the length of said spring; a ball on the extremity of said tension member bearing against the extremity of said spring so that when said spring is flexed, said tension member will pull said piston into contact with said contact member; an insulating sleeve surrounding said piston rod adjacent said piston, against which said contact member normally bears; and spring means urging said piston away from said contact member and drawing said ball against the extremity of said helical spring.

3. A curb signal indicator for attachment to an automotive vehicle comprising: a supporting block; means for attaching said block to said vehicle; a tightly coiled helical spring threaded into a socket in the outer face of said block and extending outwardly therefrom; a contact housing threaded into a socket in the inner face of said block, said housing having a piston bore therein in axial alignment with said spring; a piston slidably mounted in said bore; a piston rod extending from said piston through said block and terminating within said helical spring; a tension member attached to the extremity of said rod and extending throughout the length of said spring; a terminal ball mounted on the extremity of said tension member against the terminal of said spring; an insulating sleeve surrounding said piston rod adjacent said piston; a compression spring surrounding said piston rod and acting against said block and said insulating sleeve to maintain said tension member taut; and a contact brush member extending transversally into said housing into contact with said insulating sleeve so that when said helical spring is flexed, said piston will be drawn forwardly to close the contact with said contact brush member.

ALOIS C. DeCHANT.
FRANK C. JACHETTA.

REFERENCES CITED

The following references are of record in the file of this patent:

UNITED STATES PATENTS

| Number | Name | Date |
| --- | --- | --- |
| 2,144,286 | Dawson | Jan. 17, 1939 |
| 2,302,283 | Yarnall | Nov. 17, 1942 |
| 2,334,849 | Toney | Nov. 23, 1943 |

FOREIGN PATENTS

| Number | Country | Date |
| --- | --- | --- |
| 774,912 | France | Oct. 1, 1934 |